Dec. 11, 1951
S. L. McNAIR ET AL
2,578,078
DEVICE FOR DISCHARGING WAX AND THE LIKE
HAVING A VALVE OPERATING ROD
Filed Aug. 8, 1946
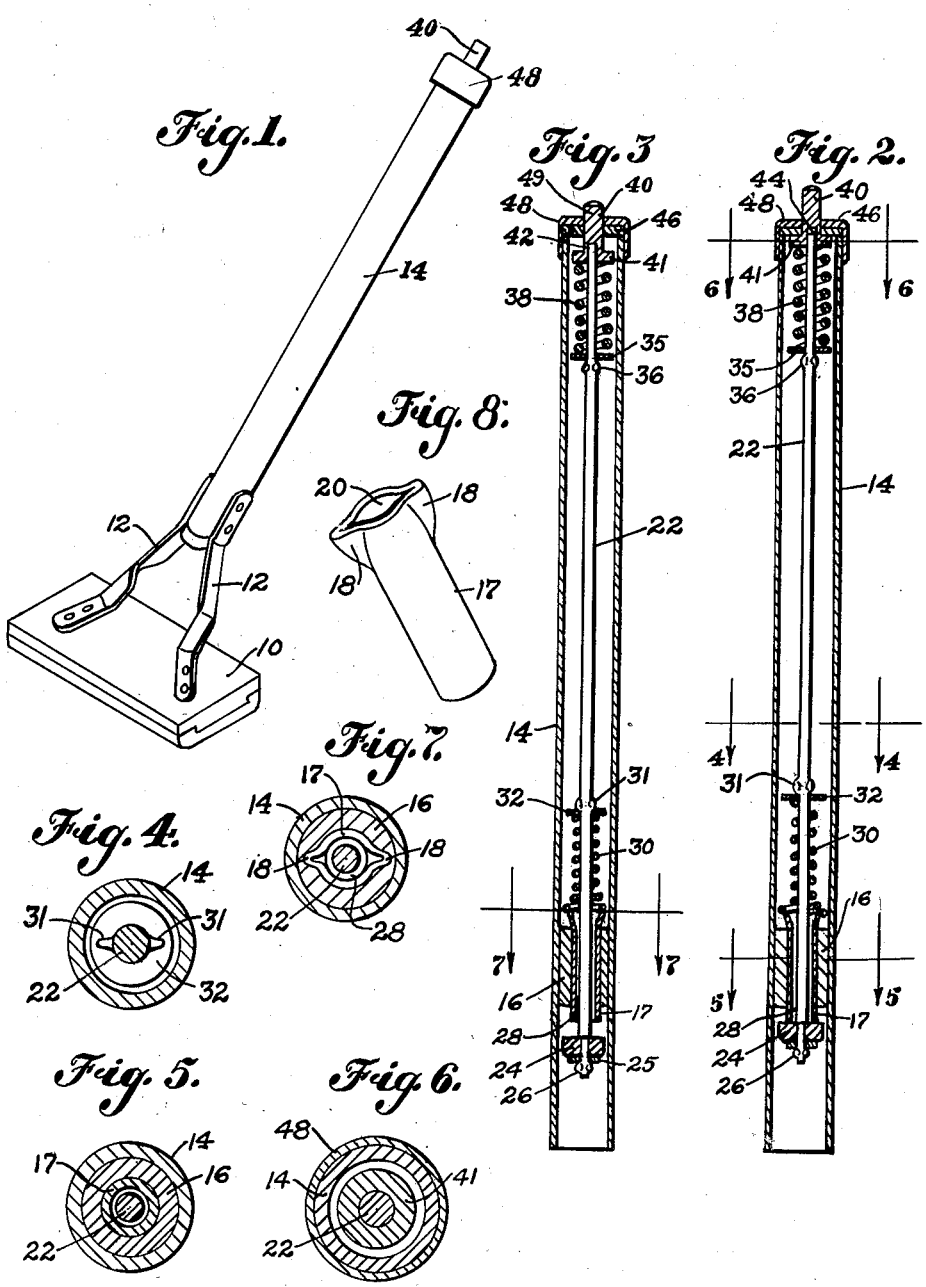
INVENTORS
Samuel L. McNair
Clarence E. Wyman
by Harold E. Cole
Attorney Patented Dec. 11, 1951

2,578,078

UNITED STATES PATENT OFFICE 2,578,078

DEVICE FOR DISCHARGING WAX AND THE LIKE HAVING A VALVE OPERATING ROD

Samuel L. McNair, Boston, and Clarence E. Wyman, Brockton, Mass., assignors to Everett E. Young Co., Inc., Whitman, Mass., a corporation of Massachusetts Application August 8, 1946, Serial No. 689,224

2 Claims. (Cl. 222—191)

This invention relates to a device for waxing or the like.

The principal object of my invention is to provide a device simple and certain in operation to control the discharge of wax. Another object is to so construct said device that its operating parts are inexpensive to make and assemble, thus providing one that can be manufactured in quantity and sold at moderate prices.

The foregoing and other objects which will appear as the nature of the invention is better understood, may be accomplished by a construction, combination and operative arrangements of parts such as is disclosed by the drawings and specifications. The nature of the invention is such as to render it susceptible to various changes and modifications, and, therefore, we are not to be limited to said disclosure; but are entitled to all such changes therefrom as fall within the scope of our claims.

In the drawings:

Figure 1 is a perspective view of our waxing device.

Figure 2 is a longitudinal view of our device showing the valve mechanism in closed position, and Figure 3 is a similar view showing said valve mechanism in open position.

Figures 4, 5 and 6 are enlarged cross-sectional views taken on the lines 4—4, 5—5 and 6—6 of Figure 2 respectively.

Figure 7 is an enlarged cross-sectional view taken on the line 7—7 of Figure 3.

Figure 8 is a perspective view of the wax passage tube which also serves as a guide for the valve control rod of our device.

As illustrated, our device has the usual spreader 10 for convenience, which is connected to a tubular handle 14 by connecting bars 12. Said handle 14 may be made of metal or plastic, and it provides a reservoir for the wax or other material to be discharged.

Snugly fitting in the lower part of said handle is a partition plug 16 which preferably is of cork or some semihard material and which preferably is not integral with said handle 14. It divides said handle 14 into an upper chamber or reservoir to hold the liquid wax or other material and a lower chamber from which the wax escapes when the valve is opened.

Said partition plug 16 has a hole extending longitudinally therethrough in which a tube 17 fits and which extends below said plug 16. This tube 17 is constricted at the top as at 18, as illustrated in Figure 8 of the drawings, whereby it forms a guide for a valve control rod 22 which extends through said plug 16 and through the greater length of said handle 14. Said tube 17 and rod 22 are of such relative diameters that there is a space 28 between them through which the wax flows.

A valve washer 24 of rubber or other suitable material is attached to said rod 22 and normally seats on the lower end of said tube 17 to establish closed position which keeps wax from passing out of said tube 17, as illustrated in Figure 2 of the drawings. A metal washer 25 is located below said valve washer 24. A protuberant portion 26 on said rod 22 below said washer 25 provides a stop to prevent said valve washer 24 from moving farther down said rod 22 than open position shown in Figure 3 of the drawings.

A coil spring 30 rests on top of the constricted portion 18 of said tube 17 which at the upper end of said spring 30 is a washer 32 and a protuberance 31 is formed on said rod 22 to keep said spring between said washer and the top of said tube 17.

The upper portion of our device has mechanism which the user operates to discharge the wax. There is a metal washer 35 mounted on said rod which is prevented from sliding farther downwardly by a protuberant portion 36 on said rod. A coil compression spring 38 rests on said washer 35, the force of which spring is preferably less than that of said spring 30 whereby said spring 38 yields to less pressure than said spring 30 does. This spring 38 serves as a stabilizer to normally keep said rod 22 firmly in position.

The thumb or finger actuating member of our device is a push button 40 extending above said handle 14 and which has a flange 41 at its lower end which is within said handle 14. In said push button 40 an upwardly extending recess 44 provides a space between the top of said rod 22 and the solid portion of said botton 40 when our device is in normal or closed position as shown in said Figure 2. In open or wax discharging position said button is pushed downwardly contacting the top of said rod as shown in said Figure 3.

A rubber washer 46 fits around said push button 40 inside a top cap 48 for our handle 14 to prevent leakage of wax. Said cap 48 has a hole 49 therein in which a portion of said button 40 slidingly fits.

In operation said push button 40 is pressed downwardly into contact with said rod 22 which is pushed downwardly thus forcing said valve washer 24 away from the bottom of said tube 17 thus permitting the liquid in said reservoir handle 14 to flow out of said tube 17 and onto the floor.

What we claim is:

1. A device of the class described comprising a reservoir handle, a separate partition member in said reservoir handle having an opening therein, a tube in said opening, said partition member completely occupying the space in said reservoir handle laterally between it and said tube, a rigid, inseparable valve actuating rod in said handle and extending through said tube embodying a valve member normally at the lower portion of and bearing against said tube, stop means on said rod above said tube, a compression spring above said valve member bearing against the upper end of said tube at one end and against said stop means at the other end, said tube being of such cross-sectional area with relation to said rod that a space is left between them through which fluid in said reservoir handle may pass, and means adapted to actuate said rod to thereby compress said spring and move said valve member away from said tube, said rod extending continuously from a point adjacent said rod actuating means to a point beyond said valve member.

2. A device of the class described comprising a reservoir handle, a separate partition member fixedly set in said reservoir handle having an opening therein, a tube set in said opening having an upper portion extending above said partition the upper end of which is wider than the portion of said tube in said partition member, said partition member completely occupying the space in said reservoir handle laterally between it and said tube, a rigid, inseparable valve actuating rod in said handle and extending through said tube embodying a valve member normally at the lower portion of and bearing against said tube, stop means on said rod above said tube, a compression spring above said valve member bearing against said tube upper and wider end at one end and against said stop means at the other end, said tube being of such cross-sectional area with relation to said rod that a space is left between them through which fluid in said reservoir handle may pass, and means adapted to actuate said rod to thereby compress said spring and move said valve member away from said tube, said rod extending continuously from a point adjacent said rod actuating means to a point beyond said valve member.

SAMUEL L. McNAIR.
CLARENCE E. WYMAN.

REFERENCES CITED

The following references are of record in the file of this patent:

UNITED STATES PATENTS

| Number | Name | Date |
| --- | --- | --- |
| 963,214 | Dunwoodie et al. | July 5, 1910 |
| 1,083,532 | Grayham | Jan. 6, 1914 |
| 1,653,430 | Choy | Dec. 20, 1927 |
| 2,069,673 | Lima | Feb. 2, 1937 |
| 2,166,803 | De Reamer | July 18, 1939 |
| 2,290,375 | Macias | July 21, 1942 |
| 2,349,665 | Levit | May 23, 1944 |